United States Patent [19]

De Bernardi

[11] Patent Number: 4,796,487
[45] Date of Patent: Jan. 10, 1989

[54] HIGH TORQUE DRIVE MEANS FOR TWO VERY CLOSE SHAFTS WHICH ARE ALSO SUBJECTED TO STRONG AXIAL THRUSTS AND APPLICATION THEREOF TO A DOUBLE SCREW EXTRUDER

[75] Inventor: Stefano De Bernardi, Busto Arsizio, Italy

[73] Assignee: Bausano & Figli S.p.A., Turin, Italy

[21] Appl. No.: 907,347

[22] Filed: Sep. 15, 1986

Related U.S. Application Data

[63] Continuation of Ser. No. 622,828, Jun. 21, 1984, Pat. No. 4,682,510, which is a continuation-in-part of Ser. No. 599,100, Apr. 11, 1984, abandoned.

[51] Int. Cl.[4] ............................................. F16H 37/06
[52] U.S. Cl. .................................... 74/665 GA; 72/29
[58] Field of Search ............ 74/665 N, 665 M, 665 L; 366/85, 301; 425/204, 208

[56] References Cited

U.S. PATENT DOCUMENTS

| | | | |
|---|---|---|---|
| 2,466,934 | 4/1949 | Dellenbarger | 18/12 |
| 2,875,645 | 3/1959 | Keyser | 74/665 GA |
| 3,056,314 | 10/1962 | Eichler et al. | 74/665 N X |
| 3,359,826 | 12/1967 | Homslik | 74/665 N |
| 3,447,611 | 6/1969 | Larsson et al. | 170/135.28 |
| 3,469,541 | 9/1969 | Simoneau | 107/54 |
| 3,605,188 | 9/1971 | McCormick et al. | 18/12 SP |
| 3,805,633 | 4/1974 | Bacher et al. | 74/410 |
| 3,824,875 | 7/1974 | Willert et al. | 74/665 GA |
| 3,881,444 | 5/1975 | Sigg | 115/37 |
| 3,894,725 | 7/1975 | Schafer | 259/192 |
| 4,016,777 | 4/1977 | Ryzhkov et al. | 74/665 K |
| 4,136,580 | 1/1979 | Brand et al. | 74/655 GA |
| 4,144,775 | 3/1979 | Schafer | 74/665 GA |
| 4,253,345 | 3/1981 | Munster | 74/665 GA |
| 4,261,225 | 4/1981 | Zahradnik | 74/665 GA |
| 4,290,270 | 9/1981 | Meeh | 60/716 |
| 4,297,917 | 11/1981 | Baner et al. | 74/665 GA |
| 4,311,472 | 1/1982 | Hiersig et al. | 440/75 |
| 4,337,623 | 7/1982 | Kronogard | 60/716 |
| 4,351,635 | 9/1982 | Staedeli | 440/75 |
| 4,389,865 | 6/1983 | Davies | 72/29 |
| 4,399,719 | 8/1983 | Chszaniecki et al. | 74/410 |
| 4,442,805 | 4/1984 | Yamakawa | 123/98 F |
| 4,504,753 | 3/1985 | Koch | 370/75 R |
| 4,574,164 | 4/1985 | Poulin | 425/208 |

Primary Examiner—Dirk Wright
Attorney, Agent, or Firm—Blum Kaplan

[57] ABSTRACT

An apparatus for rotationally driving two closely spaced shafts comprises a driven gear on each shaft and two drive apparatus for driving each of the driven gears. The shafts are constrained to rotate at the same speed by interengaging teeth of the driven gears or by an idler gear. Four indpendent motors are used to drive the shafts. If the shafts are not parallel, the driven gears may be conical. Alternatively, the driven gears may be cylindrical, and each shaft may have thereon a conical gear, the conical gears being sized and positioned to mesh.

5 Claims, 3 Drawing Sheets

HIGH TORQUE DRIVE MEANS FOR TWO VERY CLOSE SHAFTS WHICH ARE ALSO SUBJECTED TO STRONG AXIAL THRUSTS AND APPLICATION THEREOF TO A DOUBLE SCREW EXTRUDER

This is a continuation of application Ser. No. 06/622,828, now U.S. Pat. No. 4,682,510, filed June 21, 1984 which is a continuation-in-part of application Ser. No. 599,100, still pending, filed on Apr. 11, 1984.

This invention relates to drive means capable of rotating a set of two shafts arranged at a close distance from each other, either parallel or with converging axes, the shaft being subjected to strong axial thrusts. These shafts are used, for example, in a double screw extruder for plastic materials.

In the case of two adjacent shafts rotating in opposite directions, the simplest way for rotating them is to transmit the entire torque of the motor only to one of the two shafts, and then impart a rotation to the second shaft by a pair of identical gears, each one keyed to each of the two shafts, such as to mesh with the other gear. On the other hand, when the shafts rotate in the same direction, the rotation imparted to the first shaft, always by a single motor, is transmitted to the second shaft by means of an intermediate gear.

However, in these embodiments, the high speed of rotation of the shafts lead to severe wear and to very short life of the plasticizing screws. On the other hand a low speed would cause high torques and accordingly occasional breakage. Further, when the distance between the shafts is very small, the gears must have very small pitch diameters.

In the last few years, two ways have been developed to overcome this drawback.

The first way consists of making shafts carrying conical extruding screws, so that at some distance from the cone apex the gears may have larger dimensions. However, this complicates the entire construction.

A second approach is to separate the shaft actuation providing a reduction unit with two outlets each of which imparts rotation to the free end of each shaft, that is to the end opposite to the one carrying the screw. The disadvantage of this system is that the two closely spaced shafts, subjected to a strong torsion become very long in order to leave along their axis the necessary space for the housing of the thrust bearings. These are usually positioned in such a way that each thrust bearing of a shaft is offset with respect to thrust bearing of the other. Therefore this solution is still not acceptable, because the shafts, to resist the torsional stress, must greatly increase in diameter.

Attempts were also made to increase the gear sturdiness by lengthening the latter or increasing their number. However, this also considerably adds to costs.

Therefore, it is the object of the present invention to provide a structurally economical solution to the problem of driving two closely spaced parallel or converging shafts arranged at a close distance from each other which are also subjected to strong axial thrusts.

According to the present invention, the above object has been achieved by providing that two parallel or converging shafts, each fitted with a gear meshing with further gears, are each driven by at least two drive members which act on the periphery of each of said gears.

In a preferred embodiment the drive members are units which are completely independent of one another; that is having fully distinct motors.

In this case, preferably, the use of epicyclical reduction units which are readily commercially available is contemplated.

In an application of the invention to a double screw extruder for plastic materials, it is preferable that the housing containing the extruding screws is directly connected to the support of the thrust bearings, without overstressing the drive box. Preferably, the connection is obtained by means of tie rods passing through the drive box.

For two shafts in the same direction, the two gears mounted on such shafts are slightly spaced apart from each other, while the drive members are synchronized by an idle gear meshing therewith.

If the shafts are convergent it is possible for all the drive members to be conical gears which mesh with the respective conical gears of each shaft. It is also possible to provide on each shaft two cylindrical gears which do not mesh with one another; the gears being rotated by at least two drive members terminating with a cylindrical gear meshing with the respective cylindrical gear.

The invention will now be explained by exemplary embodiments as shown in the accompanying drawings, in which.

Figure 1:
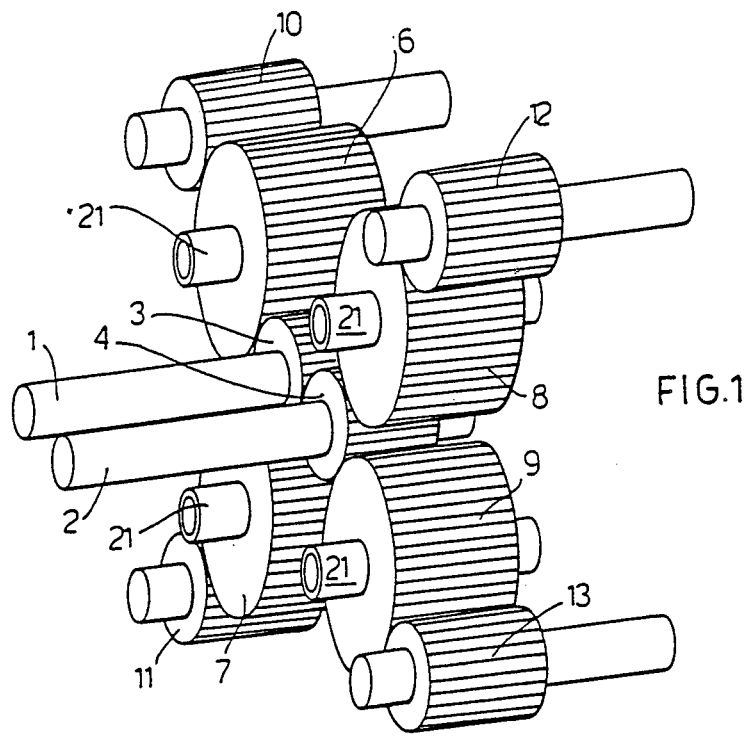
FIG. 1 is a schematic perspective view of a drive means according to the present invention, in which the two shafts rotate in opposite direction.

Referring first to FIG. 1, it will be seen that reference numerals 1 and 2 denote the two synchronized parallel counter-rotating shafts, which are arranged at a very close distance from each other. Meshing gears 3 and 4, are mounted on shafts 1 and 2 respectively. According to the present invention, rotation is imparted to each of such gears 3 and 4 by means of at least two drive members. Two torques act upon gear 3 as provided by gears 6 and 7, which are located in suitable zones extending along the dcircumference of gear 3, to limit the resulting thrust on gear 3. Gear 4 is driven by two further drive members terminating with gears 8 and 9, respectively. In the particular embodiment of FIG. 1, the drive members are gears driven by other gears 10, 11, 12 and 13, respectively, which in turn are driven by independent motors.

This approach permits a reduction in the length of gears 3 and 4 since the latter, serving for synchronization of the two shafts, do not transmit the full power. Furthermore, good power division is obtained for the power supplied to each of the gears, as each torque is applied to the respective gear 3 or 4 at spaced apart peripheral zones so as to minimize stresses.

Figure 2:
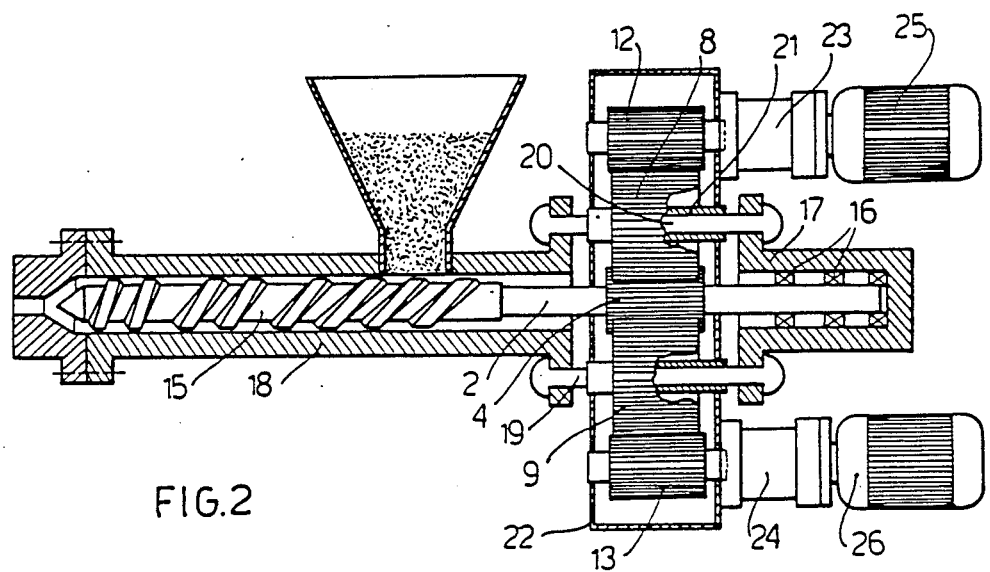
FIG. 2 is a schematic side view of the same drive means, in which one of the two extruding screws is also shown.

Referring now to FIG. 2, in which an extruder has been schematically shown, it will be seen that the screws 15 have been formed on the shafts 1 and 2, although only one screw is shown in FIG. 2. The four gears 10, 11, 12 and 13 (of which only two are shown in FIG. 2) are connected to epicyclical reduction units 23 and 24, which are driven by motors 25 and 26, respectively.

The shafts 1 and 2 must be supported by a series of axial thrust bearings 16, which in turn are supported by a support 17. The axial strain caused by the extrusion pressure of the plastic material must be supported by a housing 18 containing the extruder screws 15. According to the invention, housing 18 and support 17 are directly connected to each other, for example by tie rods 19 and 20 which conveniently pass through hollow shafts 21 carrying the gears 6, 7, 8 and 9. Thus, the drive box 22, containing the gears 3 to 13, is relieved of any stress due to these considerable strains.

Figure 3:
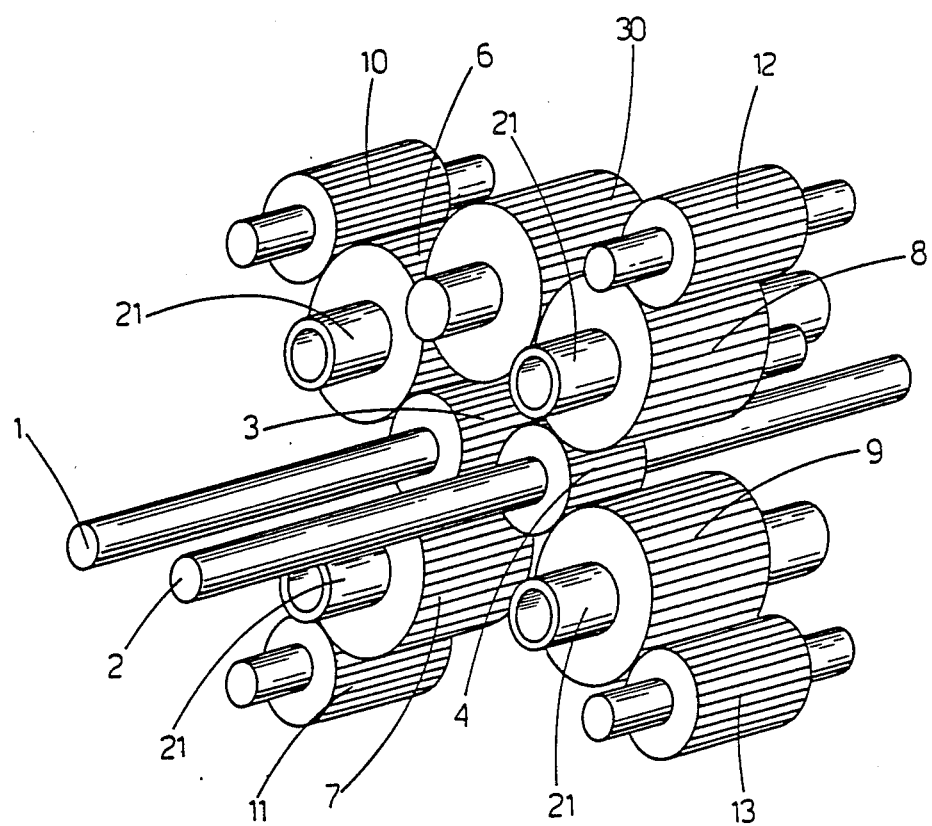
FIG. 3 is a schematic perspective view of another embodiment, in which the two shafts are caused to rotate in the same direction.

Referring to FIG. 3, it will be noted that the same reference numerals 1 and 2 are used to indicate two synchronized parallel shafts which rotate in the same direction and are arranged at a very close distance with respect to one another. Each of the shafts has gears 3 and 4 mounted thereon, but not meshing with each other. As in the embodiment of FIG. 1, each of gears 3 and 4 is caused to rotate by means of at least two drive members. Two torques are caused to act upon gear 3 by means of gear 6 and gear 7, which are arranged in suitable zones extending along the circumference of gear 3 to limit the resulting thrust on gear 3. Gear 4 is driven by two further drive members terminating with gears 8 and 9, respectively. As in FIG. 1, in this embodiment, the drive members are gears driven by further gears 10, 11, 12 and 13, respectively, which in turn are driven by independent motors.

In this embodiment, synchronism between shafts 1 and 2 is provided by gear 30 meshing with gears 6 and 8 forming part of the drive members operating the two gears 3 and 4, respectively. Also in this case, the dimensions of gears 3 and 4 may be reduced, since gears 3 and 4 serve only to transmit the portion of the power assigned thereto.

Figure 4:
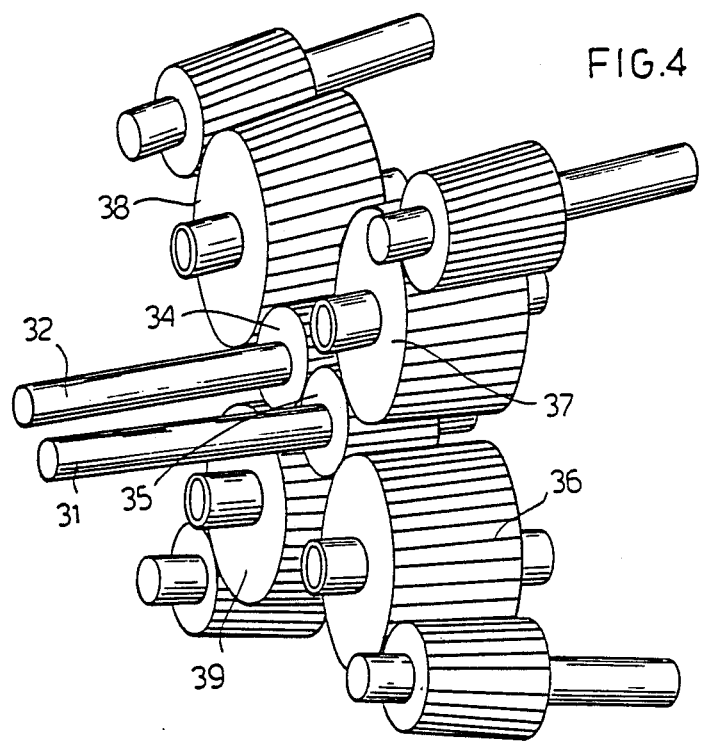
FIGS. 4 and 5 are views of two further embodiments obtained on the converging shafts.

FIG. 4 shows two converging shafts 31 and 32 on which two conical gears 35 and 34 respectively are mounted meshing with each other. On each of these, two drive members act, by means of gears 36, 37, 38, 39, which are also conical.

Figure 5:
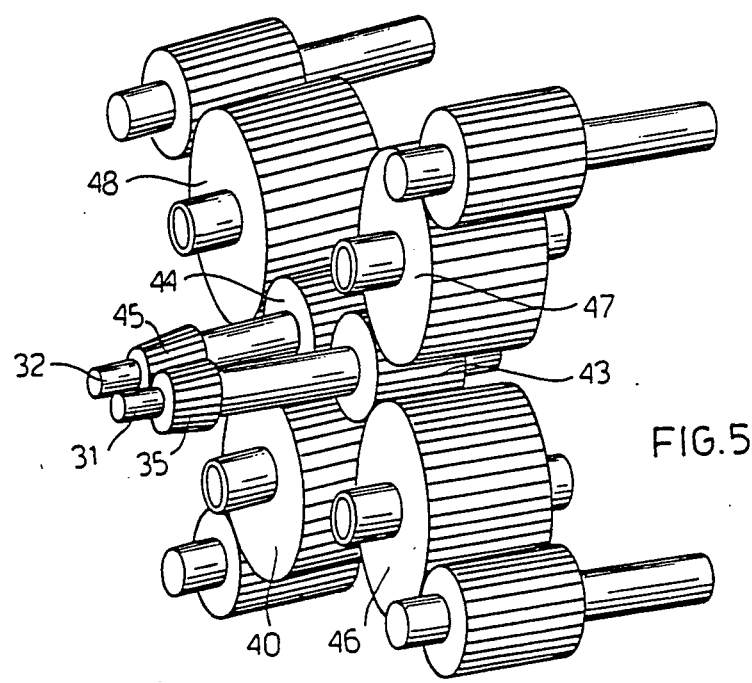

In FIG. 5 a further embodiment is shown in which the converging shafts 31 and 32 are each provided with a cylindrical gear 43 and 44, not meshing one with each other, and with meshing synchronization gear 35 and 45. The gears 43 and 44 are each driven by two driving members which act by means of their final gear 46, 47, 48, 40. In this case the driving means may all be cylindrical gears.

What I claim is:

1. An apparatus for rotationally driving two closely spaced extrusion shafts at the same speed and in opposite directions, comprising:
    a driven gear fixedly mounted on each respective shaft;
    two respective drive gears engaged with the driven gears for directly driving each said respective driven gear;
    a separate drive means for driving each respective drive gear; each said respective drive means including a motor means; and
    synchronizing means, secured on each respective shaft, for constraining each of said two closely spaced shafts to rotate at the same speed and in the opposite direction.

2. The apparatus of claim 1, wherein said synchronizing means comprises interengaging teeth of said driven gears.

3. The apparatus of claim 1, wherein said shafts are positioned so as to converge towards one another, further comprising a conical gear on each of said shafts, said conical gears meshing with one another.

4. The apparatus of claim 1, wherein said shafts are positioned so as to converge towards one another, and said driven gears are conical, said driven gears being sized and positioned so as to mesh with one another.

5. The apparatus of claim 1, wherein said shafts are parallel.

* * * * *